United States Patent
He et al.

(10) Patent No.: US 11,087,476 B2
(45) Date of Patent: Aug. 10, 2021

(54) TRAJECTORY TRACKING METHOD AND APPARATUS, COMPUTER DEVICE, AND STORAGE MEDIUM

(71) Applicant: TENCENT TECHNOLOGY (SHENZHEN) COMPANY LIMITED, Shenzhen (CN)

(72) Inventors: Changwei He, Shenzhen (CN); Chengjie Wang, Shenzhen (CN); Jilin Li, Shenzhen (CN); Yabiao Wang, Shenzhen (CN); Yandan Zhao, Shenzhen (CN); Yanhao Ge, Shenzhen (CN); Hui Ni, Shenzhen (CN); Yichao Xiong, Shenzhen (CN); Zhenye Gan, Shenzhen (CN); Yongjian Wu, Shenzhen (CN); Feiyue Huang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 16/890,087

(22) Filed: Jun. 2, 2020

(65) Prior Publication Data
US 2020/0294250 A1  Sep. 17, 2020

Related U.S. Application Data

(63) Continuation of application No. PCT/CN2019/078529, filed on Mar. 18, 2019.

(30) Foreign Application Priority Data

Mar. 28, 2018 (CN) .......................... 201810267283.4

(51) Int. Cl.
*G06K 9/00* (2006.01)
*G06T 7/246* (2017.01)
(Continued)

(52) U.S. Cl.
CPC .......... *G06T 7/246* (2017.01); *G06K 9/00295* (2013.01); *G06K 9/6215* (2013.01);
(Continued)

(58) Field of Classification Search
None
See application file for complete search history.

(56) References Cited

FOREIGN PATENT DOCUMENTS

| CN | 101464946 A | 6/2009 |
| CN | 102324024 A | 1/2012 |

(Continued)

OTHER PUBLICATIONS

Liu et al., "Tracking and recognition of multiple faces at distances", ICB 2007, LNCS 4642, pp. 513-522, 2007 (Year: 2007).*

(Continued)

*Primary Examiner* — Soo Jin Park
(74) *Attorney, Agent, or Firm* — Anova Law Group, PLLC

(57) ABSTRACT

A trajectory tracking method is provided for a computer device. The method includes performing motion tracking on head images in a plurality of video frames, to obtain motion trajectories corresponding to the head images; acquiring face images corresponding to the head images in the video frames, to obtain face image sets corresponding to the head images; determining from the face image sets corresponding to the head images, at least two face image sets having same face images; and combining motion trajectories corresponding to the at least two face image sets having same face images, to obtain a final motion trajectory of trajectory tracking.

20 Claims, 7 Drawing Sheets

(51) Int. Cl.
*G06T 7/62* (2017.01)
*G06T 7/73* (2017.01)
*G06K 9/62* (2006.01)

(52) U.S. Cl.
CPC ............... *G06T 7/62* (2017.01); *G06T 7/73* (2017.01); *G06T 2207/10016* (2013.01); *G06T 2207/30201* (2013.01); *G06T 2207/30241* (2013.01)

(56) References Cited

FOREIGN PATENT DOCUMENTS

| CN | 104361327 A | 2/2015 |
|---|---|---|
| CN | 105069408 A | 11/2015 |
| CN | 105184258 A | 12/2015 |
| CN | 106778637 A | 5/2017 |
| CN | 107341445 A | 11/2017 |
| CN | 107610151 A | 1/2018 |
| CN | 108509896 A | 9/2018 |
| WO | 2015131734 A1 | 9/2015 |

OTHER PUBLICATIONS

Zhang et al., "Joint face and head tracking inside multi-camera smart rooms", SIViP (2007) 1:163-178 (Year: 2007).*
The World Intellectual Property Organization (WIPO) International Search Report for PCT/CN2019/078529 dated Jun. 25, 2019 5 Pages (including translation).
The State Intellectual Property Office of the People's Republic of China (SIPO) Office Action 1 for 201810267283.4 dated Dec. 30, 2019 10 Pages (including translation).
Yang Yuan et al., "Real-Time System for Human Detection and Tracking at Different Distances," Pattern Recognition and Artificial Intelligence, vol. 27 No. 10, Oct. 31, 2014 (Oct. 31, 2014), pp. 939-945. 7 pages.

* cited by examiner

TRAJECTORY TRACKING METHOD AND APPARATUS, COMPUTER DEVICE, AND STORAGE MEDIUM

RELATED APPLICATIONS

This application is a continuation application of PCT Patent Application No. PCT/CN2019/078529, filed on Mar. 18, 2019, which claims priority to Chinese Patent Application No. 2018102672834, filed with the Chinese Patent Office on Mar. 28, 2018 and entitled "TRAJECTORY TRACKING METHOD AND APPARATUS, AND STORAGE MEDIUM", content of all of which is incorporated herein by reference in their entirety.

FIELD OF THE TECHNOLOGY

This application relates to the field of motion tracking technologies and, more specifically, to a trajectory tracking method and apparatus, a computer device, and a storage medium.

BACKGROUND

Currently, motion tracking technologies are widely applied to fields such as smart security protection and monitoring. In motion tracking, people present in a video are tracked to obtain complete motion trajectories of different people from appearance to disappearance in the video. Accurate motion tracking is a precondition for analyzing crowd behaviors, for example, analyzing behaviors such as fights and brawls.

Currently, during motion tracking, human bodies in all video frames of a video are first detected, a global target association algorithm is then used to associate the human bodies in all the video frames. However, in a case that a human body is blocked, the human body may fail to be detected, resulting in an association failure. In this case, motion trajectories of a crowd often cannot be obtained by using a current motion tracking solution. The disclosed methods and systems are directed to solve one or more problems set forth above and other problems.

SUMMARY

According to various embodiments provided in the present disclosure, a trajectory tracking method and apparatus, a computer device, and a storage medium are provided.

One aspect of the present disclosure provides a trajectory tracking method for a computer device. The method includes performing motion tracking on head images in a plurality of video frames, to obtain motion trajectories corresponding to the head images; acquiring face images corresponding to the head images in the video frames, to obtain face image sets corresponding to the head images; determining from the face image sets corresponding to the head images, at least two face image sets having same face images; and combining motion trajectories corresponding to the at least two face image sets having same face images, to obtain a final motion trajectory of trajectory tracking.

Another aspect of the present disclosure provides a computer device. The computer device includes a memory storing computer-readable instructions; and a processor coupled to the memory. When executing the computer-readable instructions, the processor is configured to perform: performing motion tracking on head images in a plurality of video frames, to obtain motion trajectories corresponding to the head images; acquiring face images corresponding to the head images in the video frames, to obtain face image sets corresponding to the head images; determining from the face image sets corresponding to the head images, at least two face image sets having same face images; and combining motion trajectories corresponding to the at least two face image sets having same face images, to obtain a final motion trajectory of trajectory tracking.

Another aspect of the present disclosure provides a non-transitory computer-readable storage medium. The non-transitory computer-readable storage medium stores computer program instructions executable by at least one processor to perform: performing motion tracking on head images in a plurality of video frames, to obtain motion trajectories corresponding to the head images; acquiring face images corresponding to the head images in the video frames, to obtain face image sets corresponding to the head images; determining from the face image sets corresponding to the head images, at least two face image sets having same face images; and combining motion trajectories corresponding to the at least two face image sets having same face images, to obtain a final motion trajectory of trajectory tracking.

Other aspects of the present disclosure can be understood by those skilled in the art in light of the description, the claims, and the drawings of the present disclosure.

BRIEF DESCRIPTION OF THE DRAWINGS

To describe the technical solutions of the embodiments of the present disclosure more clearly, the following briefly introduces the accompanying drawings for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

The following describes the technical solutions in the embodiments of the present disclosure with reference to the accompanying drawings. Apparently, the described embodiments are merely some but not all of the embodiments of the present disclosure. Other embodiments obtained by a person skilled in the art based on the embodiments of the present disclosure without creative efforts shall fall within the protection scope of the present disclosure.

An embodiment of the present disclosure provides a trajectory tracking system. The trajectory tracking system includes any trajectory tracking apparatus provided in the embodiments of the present disclosure. The trajectory tracking apparatus may be integrated in a server provided with a memory and installed with a processor to have a computing capability.

Figure 1:
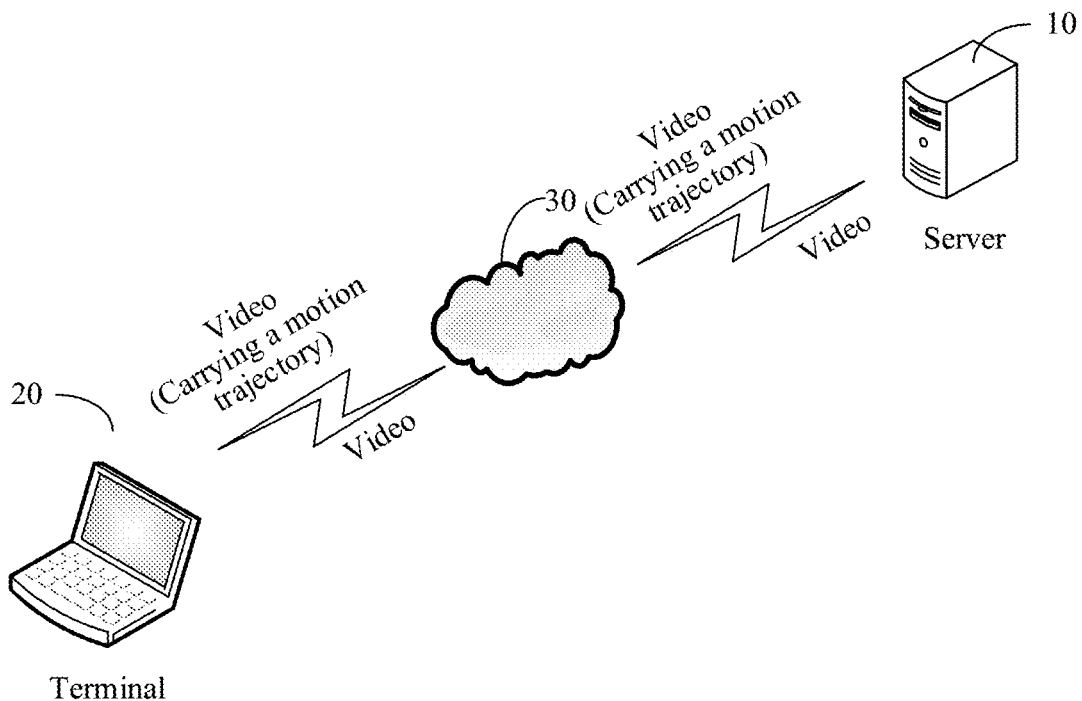
FIG. 1 is a schematic diagram of a scenario of a trajectory tracking system according to an embodiment of the present disclosure.

Referring to FIG. 1, the trajectory tracking system provided in one embodiment of the present disclosure includes a server 10 and a terminal 20. The server 10 is connected to the terminal 20 by a network 30. The network 30 includes network entities such as a router and a gateway, and the network entities are not shown one by one in FIG. 1. The terminal 20 may exchange information with the server 10 by using a wired network or a wireless network. For example, the terminal 20 may capture a video on which motion tracking needs to be performed by using a video capture device (such as a surveillance camera), and transmit the captured video to the server 10 by using the network 30. After receiving the video from the terminal 20, the server 10 performs motion tracking on head images in a plurality of video frames of the video, to obtain motion trajectories corresponding to the head images, combines motion trajectories belonging to a same person, then synthesizes a new combined motion trajectory into the video, and finally returns the video carrying the motion trajectory to the terminal 20. In this way, when the terminal 20 presents the video carrying the motion trajectories, motion trajectories of people in the video are displayed in a video picture in real-time.

Based on the trajectory tracking system shown in FIG. 1, the server 10 may obtain a video from the terminal 20 by using the network 30, and parse the video, to obtain a plurality of video frames; perform motion tracking on head images in the plurality of video frames, to obtain motion trajectories corresponding to the head images; acquire face images corresponding to the head images in the video frames, to obtain face image sets corresponding to the head images; determine, from the face image sets corresponding to the head images, at least two face image sets having the same face images; and combine motion trajectories corresponding to the determined face image sets. Subsequently, the server 10 may synthesize a new combined motion trajectory into the video, and transmit the video carrying the motion trajectory to the terminal 20 by using the network 30.

The example shown in FIG. 1 is merely an example of a system architecture for implementing the embodiments of the present disclosure, and the embodiments of the present disclosure are not limited to the system architecture shown in FIG. 1.

In one embodiment, descriptions are provided from the perspective of a trajectory tracking apparatus. Specifically, the trajectory tracking apparatus may be integrated in a server.

A trajectory tracking method includes: performing motion tracking on head images in a plurality of video frames, to obtain motion trajectories corresponding to the head images; acquiring face images corresponding to the head images in the video frames, to obtain face image sets corresponding to the head images; determining, from the face image sets corresponding to the head images, at least two face image sets having the same face images; and combining motion trajectories corresponding to the determined face image sets.

Figure 2A:
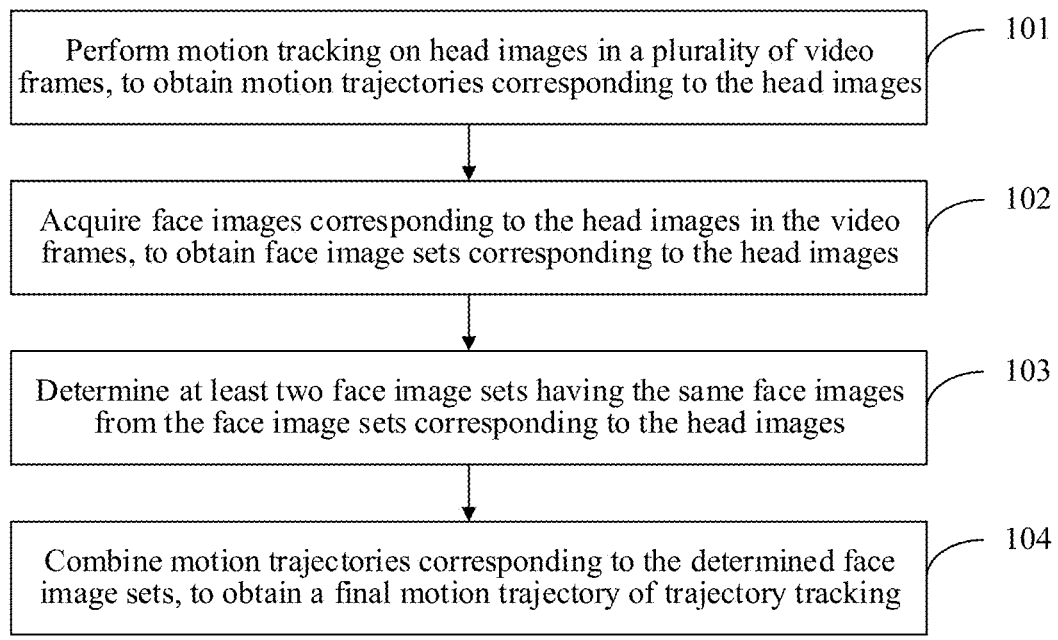
FIG. 2A is a first schematic flowchart of a trajectory tracking method according to an embodiment of the present disclosure.

FIG. 2A is a schematic flowchart of a trajectory tracking method according to an embodiment of the present disclosure. As shown in FIG. 2A, the trajectory tracking method includes the followings.

Step 101: Perform motion tracking on head images in a plurality of video frames, to obtain motion trajectories corresponding to the head images.

In one embodiment of the present disclosure, a trajectory tracking apparatus first obtains a video on which motion tracking needs to be performed. A manner of obtaining the video is not specifically limited herein, and the video on which motion tracking needs to be performed may be obtained in a plurality of manners. For example, a video that is actively pushed by a surveillance device and on which motion tracking needs to be performed nay be received. For another example, a video on which motion tracking needs to be performed may be actively pulled from a surveillance device.

Figure 2B:
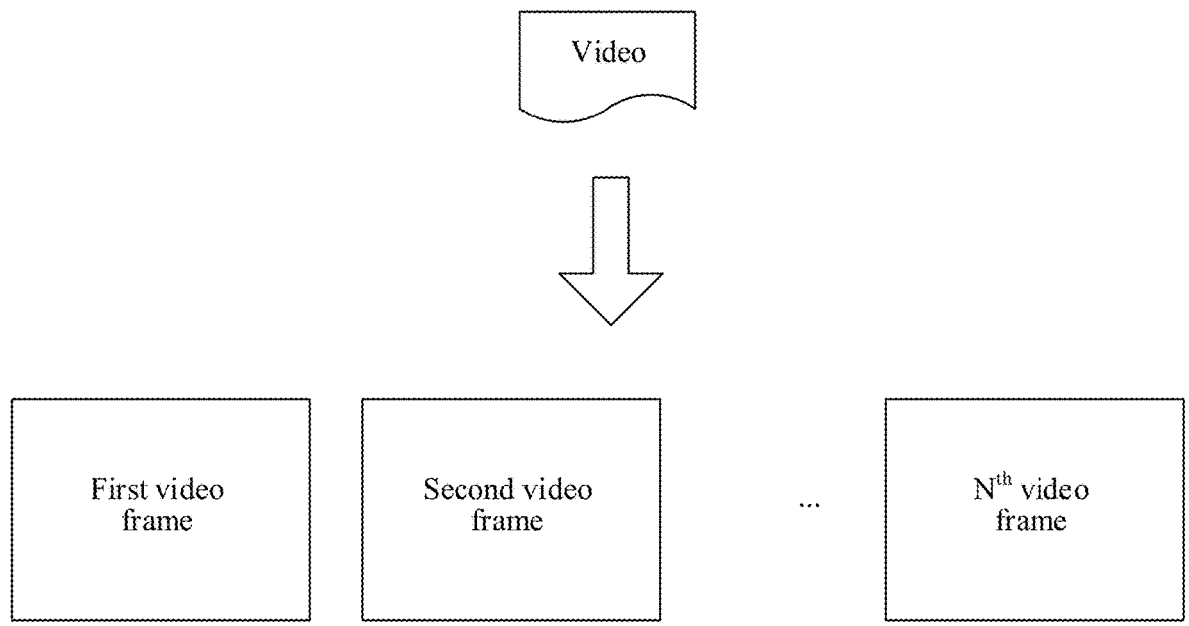
FIG. 2B is an exemplary diagram of decoding a video to obtain a plurality of video frames according to an embodiment of the present disclosure.

After obtaining the video on which motion tracking needs to be performed, the trajectory tracking apparatus first decodes video stream data of the video, to obtain a plurality of video frames corresponding to the video. For example, referring to FIG. 2B, the video on which motion tracking needs to be performed is decoded, to obtain N video frames.

Considering that a head is an essential part of a human body, and a motion trajectory of the head of a person is definitely consistent with a motion trajectory of the entire human body of the person, a motion trajectory of a head is used as a motion trajectory of a person. In other words, in one embodiment, the head images present in the plurality of video frames are used as tracking targets, and a head tracking algorithm is used for performing motion tracking on the head images in the video frames, to obtain the motion trajectories corresponding to the head images.

Motion tracking on the head images may be performed based on profile information, color information (such as color of hair and distribution of the color), motion information (such as motion correlation between points on a head surface), and the like of the head images. With reference to the information of the head images, head tracking algorithms that may be used include the followings.

In a model method, a head and organs of the head are modeled, and template matching is used for implementing motion tracking on the head images.

In a grayscale distribution method, a mosaic diagram of grayscale distribution on a head surface in a three-dimensional space is solved, and matching is used for implementing motion tracking on the head images.

In a block feature method, motion tracking on the head images is implemented by using motion vector calculation of block features in batches. The method has advantages such as high precision and independence of a specific target model, so that tracking of free motions of the head images can be implemented.

Which head tracking algorithm is to be used is not specifically limited. The head tracking algorithm may be selected according to an actual requirement. Any appropriate head tracking algorithm may be used.

It is easy to be understood that during a motion, compared with an entire human body, a head is less likely to be blocked, so that a more accurate motion trajectory is obtained when motion tracking is performed on a head image.

Step 102: Acquire face images corresponding to the head images in the video frames, to obtain face image sets corresponding to the head images.

Correspondences between the head images and the face images are used for describing that head images and face images that correspond to each other belong to a same person. The correspondences between the head images and the face images may be established before motion tracking starts to be performed on the head images or may be simultaneously established when motion tracking is performed on the head images or may be established after motion tracking has been performed on the head images.

Optionally, in an embodiment, before the performing motion tracking on head images in a plurality of video frames, to obtain motion trajectories corresponding to the head images, the method further includes: performing head detection and face detection on the plurality of video frames, to determine head images and face images in the video frames; and determining head images and face images that are in the video frames and belong to a same person, and establishing correspondences between the head images and the face images that belong to a same person.

The acquiring face images corresponding to the head images in the video frames includes: acquiring, according to the established correspondences, face images corresponding to the head images in the video frames.

In one embodiment, after obtaining the video on which motion tracking needs to be performed and decoding the video to obtain the plurality of video frames, the trajectory tracking apparatus first performs head detection and face detection on the plurality of video frames, to determine head images and face images in the video frames. Head detection is performed on each of the video frames to obtain head data. The head data includes one or more head coordinate boxes used for indicating positions of one or more head images. Face detection is performed on each of the video frames to obtain face data. The face data includes one or more face coordinate boxes used for indicating positions of one or more face images. Both the head coordinate boxes and the face coordinate boxes are rectangular boxes.

For any one of the plurality of video frames, a head detection algorithm (such as an AdaBoost method, an support vector machine (SVM) method, a Bayesian method, and a neural network method) and a face detection algorithm (such as the AdaBoost method, a classification and regression tree method, and a neural network method) may be separately used to perform head detection and face detection on the video frame, to determine head images and face images in the video frame. Which head detection algorithm and which face detection algorithm are used is not specifically limited. The head detection algorithm and the face detection algorithm may be selected according to an actual requirement.

Figure 2C:
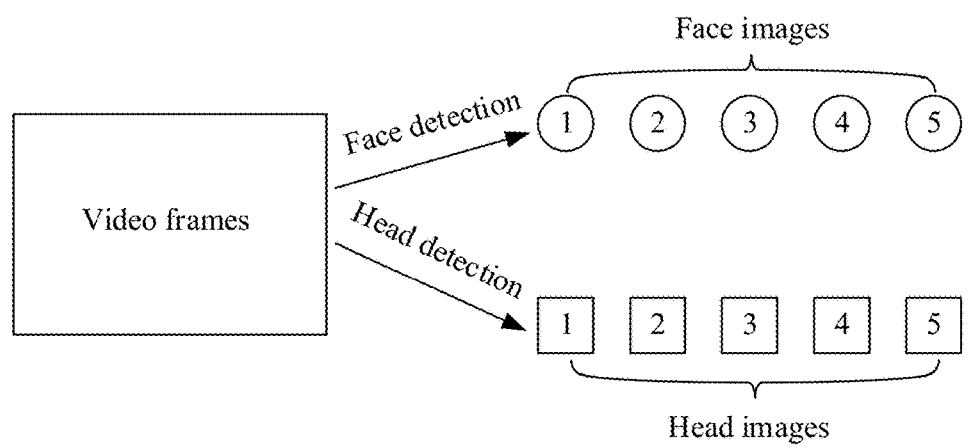
FIG. 2C is a schematic flowchart of determining head images and face images in video frames according to an embodiment of the present disclosure.

For example, referring to FIG. 2C, a head detection algorithm is used for detecting a video frame to obtain 5 different head images, and a face detection algorithm is used for detecting the video frame to obtain 5 different face images.

After the head images and the face images in the video frames are determined, correspondences between the head images and the face images need to be established. That is, correspondences between head images and face images that are in the video frames and belong to a same person are established. Therefore, the head images and the face images that are in the video frames and belong to a same person first need to be determined.

Specifically, the determining the head images and the face images that are in the video frames and belong to a same person includes: obtaining area overlap ratios between the head images and the face images that are determined from the video frames; and determining, according to the area overlap ratios obtained from the video frames, head images and face images that are in the video frames and belong to a same person.

For any video frame, assuming that m number of head images and n number of face images (m may be equal or not equal to n, which specifically depends an actual detection result) are determined from the video frame, area overlap ratios between each of the m head images and the n face images are then obtained. Because there are m*n combination manners among the m head images and the n face images, m*n area overlap ratios are obtained.

Figure 2D:
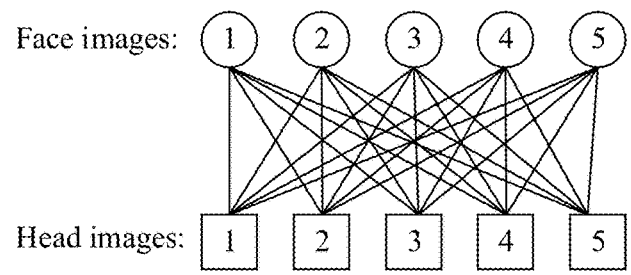
FIG. 2D is an exemplary diagram of a combination manner between head images and face images in video frames according to an embodiment of the present disclosure.

For example, referring to FIG. 2D, a video frame is used as an example. 5 different face images and 5 different head images are determined from the video frame. Area overlap ratios between each of the head images and the 5 face images are obtained, in this case, 5*5, that is, a total of 25 overlap ratios are obtained. To be specific, there are 25 possible combination manners between the head images and the face images.

Because both the head images and the face images are irregular, to implement quick calculation of the area overlap ratios, in one embodiment, areas of head coordinate boxes corresponding to the head images are used for representing areas of the head images, and areas of face coordinate boxes corresponding to the face images are used for representing areas of the face images. For any combination of a head image and a face image, an area overlap ratio thereof is calculated according to the following formula:

$$IOU\ (A,\ B) = \frac{|A \cap B|}{|A \cup B|},$$

where A represents the head image; B represents the face image; IOU (A, B) represents an overlap ratio between the head image and the face image; $|A \cap B|$ represents an area of an intersection region between a head coordinate box corresponding to the head image and a face coordinate box corresponding to the face image; and $|A \cup B|$ represents an area of a union region between the head coordinate box corresponding to the head image and the face coordinate box corresponding to the face image.

After the area overlap ratios corresponding to various combination manners among the head images and the face images in the video frames are obtained, head images and face images that are in the video frames and belong to a same person are determined according to the area overlap ratios obtained from the video frames.

Specifically, in one embodiment, that head images and face images that are in the video frames and belong to a same person are determined according to the area overlap ratios obtained from the video frames includes: performing bipartite graph optimal matching on the head images and the face images in the video frames according to the area overlap ratios obtained from the video frames; and determining that head images and face images that are in the video frames and match each other belong to a same person.

In one embodiment of the present disclosure, for any video frame, a bipartite graph in which head images and face images are used as vertexes is constructed according to area overlap ratios obtained from the video frame, and optimal matching (or referred to as maximum matching) is then solved for the bipartite graph, to determine that a head image and a face image that match each other belong to a same person. The Hungarian algorithm may be used for solving the optimal matching of the bipartite graph.

After the head images and the face images that are in the video frames and belong to a same person are determined, correspondences between the head images and the face images that belong to a same person can be established. In other words, the head images and the face images that are in the video frames and belong to a same person are bound.

Correspondingly, the face images corresponding to the head images in the video frames may be correspondingly acquired according to the established correspondences, so as to obtain face image sets corresponding to the head images (including face images that are in the video frames and belong to a same person as the head images).

Specifically, in another embodiment, the determining, according to the area overlap ratios obtained from the video frames, head images and face images that are in the video frames and belong to a same person includes: determining that each of the head images in the video frames and a face image having the highest area overlap ratio with the head image belong to a same person.

For example, for any video frame, m head images and n face images are detected from the video frame. There are n combination manners between each of the m head images and the face images. Correspondingly, for each head image, a total of n area overlap ratios between the head image and the different face images are obtained. In this case, for the first head image in the m head images, if an area overlap ratio between the first head image and the second face image in the n face images is greater than an area overlap ratio between the first head image and a face image other than the second face image, it is determined that the first head image and the second face image belong to a same person.

After the head images and the face images that are in the video frames and belong to a same person are determined, correspondences between the head images and the face images that belong to a same person can be established. In other words, the head images and the face images that are in the video frames and belong to a same person are bound.

Correspondingly, the face images corresponding to the head images in the video frames may be correspondingly acquired according to the established correspondences, so as to obtain face image sets corresponding to the head images (including face images that are in the video frames and belong to a same person as the head images).

Optionally, in an embodiment, the performing head detection and face detection on the plurality of video frames, to determine head images and face images in the video frames includes: performing head detection on the plurality of video frames, to determine head images in the video frames; and performing face detection on the head images determined from the video frames, to determine face images in the head images in the video frames. The determining head images and face images that are in the video frames and belong to a same person includes: determining that a head image in each of the video frames and a face image determined from the head image belong to a same person.

Figure 2E:
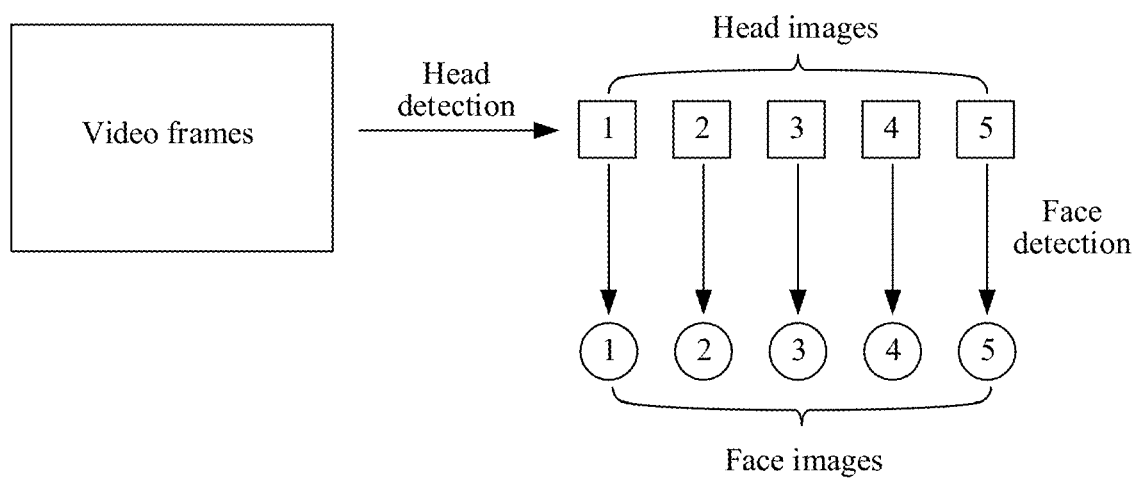
FIG. 2E is another schematic flowchart of determining head images and face images in video frames according to an embodiment of the present disclosure.

For example, referring to FIG. 2E, any video frame is used as an example. Head detection is first performed on the video frame, to determine head images in the video frame; and face detection is then performed on a head image determined from the video frame, to determine a face image in the head image. Because the face image is directly determined from the determined head image, it is determined that the head image and the face image determined from the head image belong to a same person.

Step 103: Determine at least two face image sets having the same face images from the face image sets corresponding to the head images.

In one embodiment of the present disclosure, after the face image sets corresponding to the head images are obtained, at least two face image sets having the same face images are determined from the face image sets corresponding to the head images.

Specifically, the determining at least two face image sets having the same face images from the face image sets corresponding to the head images includes: selecting two face image sets from the face image sets corresponding to the head images; obtaining similarities among face images in the two selected face image sets, to obtain a plurality of similarities; determining whether a similarity reaching a first preset similarity exists in the plurality of obtained similarities; and determining, in a case that a similarity reaching the first preset similarity exists in the plurality of obtained similarities, that the two selected face image sets have same face images.

Any two face image sets may correspond to a same head image, and may also correspond to different head images. In other words, any two face image sets may belong to a same person or may belong to different people.

In one embodiment of the present disclosure, after the face image sets corresponding to the head images are obtained, two face image sets are first selected from the face image sets corresponding to the head images. Specifically, two face image sets may be arbitrarily selected.

After the two face image sets are selected, similarities among face images in the two selected face image sets are obtained, to obtain a plurality of similarities. For example, one of the selected face image sets includes 5 face images, and another one of the selected face image sets includes 6 face images. Because there are a total of 5*6, that is, 30 combination manners among the face images of the two selected face image sets, 30 similarities corresponding to the different combination manners among the face images of the face image sets are obtained.

After the plurality of similarities are obtained, it is further determined whether a similarity reaching the first preset similarity exists in the plurality of obtained similarities. In other words, it is determined whether a maximum similarity in the plurality of obtained similarities reaches the first preset similarity. The first preset similarity is used for describing that two face images are the same, or that the two face images belong to the same person. The value of the first preset similarity may be set according to an actual requirement. For example, the first preset similarity may be set to 95%.

In a case that a similarity reaching the first preset similarity exists in the plurality of obtained similarities, it can be determined that the two selected face image sets have same face images. That is, two face images between which a similarity reaches the first preset similarity are the same.

Optionally, in an embodiment, after the determining whether a similarity reaching a first preset similarity exists in the plurality of obtained similarities, the method further includes: obtaining an average similarity of the plurality of similarities in a case that none of the plurality of obtained similarities reaches the first preset similarity; and determining whether the average similarity reaches a second preset similarity, the second preset similarity being less than the first preset similarity; and determining, in a case that the average similarity reaches the second preset similarity, that the two face image sets have same face images.

After the plurality of similarities are obtained, it is further determined whether a similarity reaching the first preset similarity exists in the plurality of obtained similarities. In other words, it is determined whether a maximum similarity in the plurality of obtained similarities reaches the first preset similarity. In a case that none of the plurality of obtained similarities reaches the first preset similarity, an average similarity of the plurality of obtained similarities is further calculated. Subsequently, it is determined whether the calculated average similarity reaches a second preset similarity, the second preset similarity being configured to be less than the first preset similarity. For example, when the first preset similarity is configured to be 95%, the second preset similarity is configured to be 85%. In a case that the calculated average similarity reaches the second preset similarity, it is determined that the two selected face image sets have same face images.

Specifically, in an embodiment, the obtaining similarities among face images in the two face image sets includes: separately selecting one face image from the two face image sets, to obtain two face images; separately obtaining multidimensional image features of the two selected face images, to obtain a first image feature set and a second image feature set; and obtaining a distance between the first image feature set and the second image feature set, and using the obtained distance as a similarity between the two face images.

The type of the obtained image feature is not specifically limited herein, and may be selected by a person skilled in the art according to an actual requirement. For example, a histogram of oriented gradient (HOG) feature, a color feature, a template feature, and a structural feature of a face image may be obtained.

After the multidimensional image features of the two face images are separately obtained to obtain the first image feature set and the second image feature set, a distance between the first image feature set and the second image feature set is obtained, and the obtained distance is used as a similarity between the two face images. Any feature distance (such as a Euclidean distance, a Manhattan distance, or a Chebyshev distance) may be selected according to an actual requirement to measure a distance between the two image feature sets.

For example, a cosine distance between the first image feature set and the second image feature set may be obtained, and is specifically obtained according to the following formula:

$$e = \frac{\sum_{i=1}^{N} f_i g_i}{\sqrt{\sum_{i=1}^{N} f_i^2} \sqrt{\sum_{i=1}^{N} g_i^2}},$$

where e represents the cosine distance between the first image feature set and the second image feature set; f represents the first image feature set; N represents dimensions of the first image feature set and the second image feature set (dimensions of the two image feature sets are the same); $f_i$ represents an image feature in an $i^{th}$ dimension in the first image feature set; and $g_i$ represents an image feature in an $i^{th}$ dimension in the second image feature set.

Step 104: Combine motion trajectories corresponding to the determined face image sets, to obtain a final motion trajectory of trajectory tracking.

In one embodiment of the present disclosure, after the at least two face image sets having the same face images are determined, that is, after the face image sets belonging to a same person are determined, motion trajectories corresponding to the determined face image sets belonging to a same person are combined (head images corresponding to the face image sets are first determined, and motion trajectories corresponding to the head images are then determined as the motion trajectories corresponding to the face image sets), to obtain a final motion trajectory of trajectory tracking, that is, a complete motion trajectory corresponding to the person.

When the motion trajectories are combined, a motion trajectory A and a motion trajectory B are used as an example. If a moment of a video frame (that is, a moment at which the video frame is located in a video) in which a head image at the tail of the motion trajectory A is located is earlier than a moment of a video frame (that is, a moment at which the video frame is located in the video) in which a head image at the head of the motion trajectory B is located, the tail of the motion trajectory A is connected to the head of the motion trajectory B, thereby implementing the combination of the motion trajectory A and the motion trajectory B.

Figure 2F:
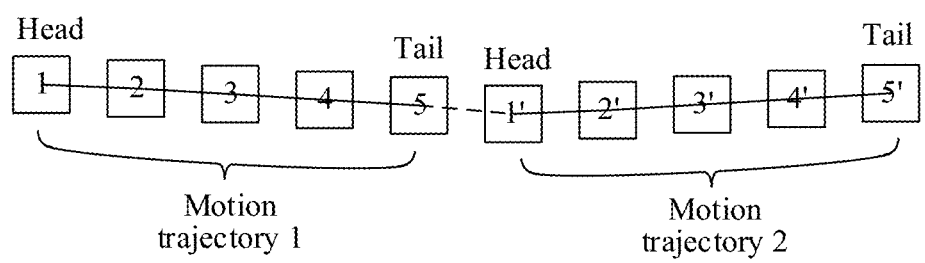
FIG. 2F is a schematic diagram of combining motion trajectories according to an embodiment of the present disclosure.

For example, referring to FIG. 2F, two determined motion trajectories belonging to a same person are shown. A motion trajectory 1 includes a head image 1, a head image 2, a head image 3, a head image 4, and a head image 5, and the 5 head images are same head images (in other words, head images of a same head in different video frames); and a motion trajectory 2 includes a head image 1', a head image 2', a head image 3', a head image 4', and a head image 5', and the 5 head images are same head images (in other words, head images of a same head in different video frames). By comparison, a moment of a video frame in which the head image 5 is located is earlier than a moment of a video frame in which the head image 1' is located. Therefore, the tail of the motion trajectory 1 is connected to the head of the motion trajectory 2, to obtain a complete motion trajectory of the person.

It can be learned from above that in the trajectory tracking method, motion tracking is performed on head images in a plurality of video frames, to obtain motion trajectories corresponding to the head images; face images corresponding to the head images in the video frames are acquired, to obtain face image sets corresponding to the head images; at least two face image sets having the same face images are determined from the face image sets corresponding to the head images; and motion trajectories corresponding to the determined face image sets are combined, to obtain a final motion trajectory of trajectory tracking. Because a head feature is relatively fixed compared with other parts of a human body and is less likely to be blocked, a more accurate motion trajectory can be obtained by performing motion tracking on a head image compared with performing motion tracking on an entire human body. Even though tracking is interrupted, interrupted motion trajectories can be combined by using the face images corresponding to the head images, so as to improve the accuracy of motion tracking.

In an embodiment, an example in which the video on which motion tracking needs to be performed is a surveillance video captured by a surveillance camera is used as an example for describing the trajectory tracking method provided in the present disclosure in detail.

In one embodiment, descriptions are provided from the perspective of a trajectory tracking system. The trajectory tracking system includes a terminal, a network, and a server. The terminal is connected to and controls a surveillance camera, receives video images from the surveillance camera, performs encoding to obtain a surveillance video, and subsequently uses the surveillance video obtained through encoding as a video on which motion tracking needs to be performed, so that the video is transmitted to the server by using the network. The server performs motion tracking on the surveillance video from the terminal, to obtain complete motion trajectories of all head images (that is, motion trajectories of the head images from appearance to disappearance) present in the surveillance video, then synthesizes the obtained motion trajectories into the surveillance video, and finally returns the surveillance video carrying the motion trajectories to the terminal.

Figure 3A:
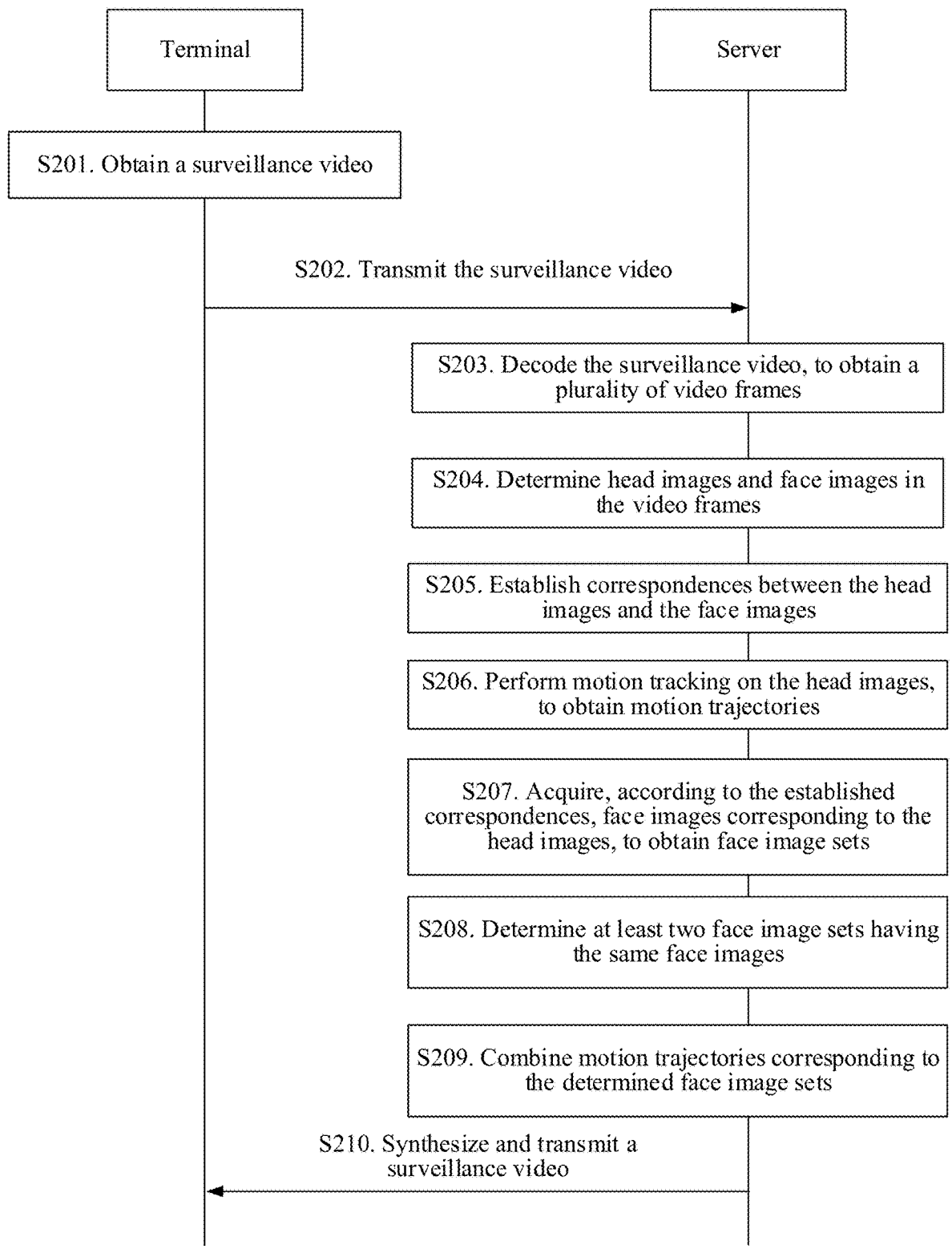
FIG. 3A is a second schematic flowchart of a trajectory tracking method according to an embodiment of the present disclosure.

Specifically, referring to FIG. 3A, a specific procedure of the trajectory tracking method includes followings.

S201: A terminal obtains a surveillance video by using a surveillance camera.

The terminal may be simultaneously connected to a plurality of surveillance cameras. During the acquisition of the surveillance video, the terminal may select, according to a tracking requirement, one of the surveillance camera to acquire the surveillance video.

S202: The terminal transmits the obtained surveillance video to a server by using a network.

The network includes network entities such as a router and a gateway and is used for exchanging information with the terminal and the server.

S203: The server decodes the surveillance video, to obtain a plurality of video frames of the surveillance video.

After receiving the surveillance video from the terminal, the server uses the surveillance video as a video on which motion tracking needs to be performed, decodes video stream data of the surveillance video, to obtain a plurality of video frames corresponding to the surveillance video.

S204: The server performs head detection and face detection on the plurality of video frames, to determine head images and face images in the video frames.

For any one of the plurality of video frames, a head detection algorithm (such as an AdaBoost method, an support vector machine (SVM) method, a Bayesian method, and a neural network method) and a face detection algorithm (such as the AdaBoost method, a classification and regression tree method, and a neural network method) may be separately used to perform head detection and face detection on the video frame, to determine head images and face images in the video frame. Which head detection algorithm and which face detection algorithm are used is not specifically limited, which may be selected according to an actual requirement.

For example, referring to FIG. 2C, a head detection algorithm is used for detecting a video frame to obtain 5 different head images, and a face detection algorithm is used for detecting the video frame to obtain 5 different face images.

S205: The server determines head images and face images that are in the video frames and belong to a same person, and establishes correspondences between the head images and the face images that belong to a same person.

Specifically, the determining head images and face images that are in the video frames and belong to a same person includes: obtaining area overlap ratios between the head images and the face images that are determined from the video frames; and determining, according to the area overlap ratios obtained from the video frames, head images and face images that are in the video frames and belong to a same person.

For a video frame, assuming that m head images and n face images (m may be equal or not equal to n, which specifically depends an actual detection result) are determined from the video frame, area overlap ratios between each of the m head images and the n face images are then obtained. Because there are m*n combination manners among the m head images and the n face images, m*n area overlap ratios are obtained.

For example, referring to FIG. 2D, a video frame is used as an example. 5 different face images and 5 different head images are determined from the video frame. Area overlap ratios between each of the head images and the 5 face images are obtained, in this case, 5*5, that is, a total of 25 overlap ratios are obtained. To be specific, there are 25 possible combination manners between the head images and the face images.

Because both the head images and the face images are irregular, to implement quick calculation of the area overlap ratios, in one embodiment, areas of head coordinate boxes corresponding to the head images are used for representing areas of the head images, and areas of face coordinate boxes corresponding to the face images are used for representing areas of the face images. For any combination of a head image and a face image, an area overlap ratio thereof is calculated according to the following formula:

$$IOU\ (A,\ B) = \frac{|A \cap B|}{|A \cup B|},$$

where A represents the head image; B represents the face image; IOU(A, B) represents an overlap ratio between the head image and the face image; $|A \cap B|$ represents an area of an intersection region between a head coordinate box corresponding to the head image and a face coordinate box corresponding to the face image; and $|A \cup B|$ represents an area of a union region between the head coordinate box corresponding to the head image and the face coordinate box corresponding to the face image.

After the area overlap ratios corresponding to various combination manners among the head images and the face images in the video frames are obtained, head images and face images that are in the video frames and belong to a same person are determined according to the area overlap ratios obtained from the video frames.

Specifically, in an optional implementation, that head images and face images that are in the video frames and belong to a same person are determined according to the area overlap ratios obtained from the video frames includes: performing bipartite graph optimal matching on the head images and the face images in the video frames according to the area overlap ratios obtained from the video frames; and determining that head images and face images that are in the video frames and match each other belong to a same person.

In one embodiment of the present disclosure, for any video frame, a bipartite graph in which head images and face images are used as vertexes is constructed according to area overlap ratios obtained from the video frame, and optimal matching (or referred to as maximum matching) is then solved for the bipartite graph, to determine that a head image and a face image that match each other belong to a same person.

The Hungarian algorithm may be used for solving the optimal matching of the bipartite graph.

After the head images and the face images that are in the video frames and belong to a same person are determined, correspondences between the head images and the face images that belong to a same person can be established. In other words, the head images and the face images that are in the video frames and belong to a same person are bound.

Specifically, in another optional implementation, the determining, according to the area overlap ratios obtained from the video frames, head images and face images that are in the video frames and belong to a same person includes: determining that each of the head images in the video frames and a face image having the highest area overlap ratio with the head image belong to a same person.

For example, for a video frame, m head images and n face images are detected from the video frame. There are n combination manners between each of the m head images and the face images. Correspondingly, for each head image, a total of n area overlap ratios between the head image and the different face images are obtained. In this case, for the first head image in the m head images, if an area overlap ratio between the first head image and the second face image in the n face images is greater than an area overlap ratio between the first head image and a face image other than the second face image, it is determined that the first head image and the second face image belong to a same person.

After the head images and the face images that are in the video frames and belong to a same person are determined, correspondences between the head images and the face images that belong to a same person can be established. In other words, the head images and the face images that are in the video frames and belong to a same person are bound.

S206: The server performs motion tracking on the head images in the plurality of video frames, to obtain motion trajectories corresponding to the head images.

Considering that a head is an essential part of a human body, and a motion trajectory of the head of a person is definitely consistent with a motion trajectory of the entire human body of the person, a motion trajectory of a head is used as a motion trajectory of a person. In other words, the head images in the plurality of video frames are used as tracking targets, and a head tracking algorithm is used for performing motion tracking on the head images in the video frames, to obtain the motion trajectories corresponding to the head images.

Motion tracking on the head images may be performed based on profile information, color information (such as color of hair and distribution of the color), motion information (such as motion correlation between points on a head surface), and the like of the head images. With reference to the information of the head images, head tracking algorithms that may be used include, but are not limited to, the following methods:

In a model method, a head and organs of the head are modeled, and template matching is used for implementing motion tracking on the head images.

In a grayscale distribution method, a mosaic diagram of grayscale distribution on a head surface in a three-dimensional space is solved, and matching is used for implementing motion tracking on the head images.

In a block feature method, motion tracking on the head images is implemented by using motion vector calculation of block features in batches. The method has advantages such as high precision and independence of a specific target model, so that tracking of free motions of the head images can be implemented.

S207: The server acquires, according to the established correspondences, face images corresponding to the head images in the video frames, to obtain face image sets corresponding to the head images.

The server may correspondingly acquire, according to the previously established correspondences between the head images and the face images, face images corresponding to the head images in the video frames, so as to obtain face image sets corresponding to the head images (including face images that are in the video frames and belong to a same person as the head images).

S208: The server determines at least two face image sets having the same face images from the face image sets corresponding to the head images.

After the face image sets corresponding to the head images are obtained, at least two face image sets having the same face images are determined from the face image sets corresponding to the head images.

Specifically, the determining at least two face image sets having the same face images from the face image sets corresponding to the head images includes: selecting two face image sets from the face image sets corresponding to the head images; obtaining similarities among face images in the two selected face image sets, to obtain a plurality of similarities; determining whether a similarity reaching a first preset similarity exists in the plurality of obtained similarities; and determining, in a case that a similarity reaching the first preset similarity exists in the plurality of obtained similarities, that the two selected face image sets have same face images.

Any two face image sets may correspond to a same head image, and may also correspond to different head images. In other words, any two face image sets may belong to a same person or may belong to different people.

In one embodiment of the present disclosure, after the face image sets corresponding to the head images are obtained, two face image sets are first selected from the face image sets corresponding to the head images. Specifically, two face image sets may be arbitrarily selected.

After the two face image sets are selected, similarities among face images in the two selected face image sets are obtained, to obtain a plurality of similarities. For example, one of the selected face image sets includes 5 face images, and the other of the selected face image sets includes 6 face images. Because there are a total of 5*6, that is, 30 combination manners among the face images of the two selected face image sets, 30 similarities corresponding to the different combination manners among the face images of the face image sets are obtained.

After the plurality of similarities are obtained, it is further determined whether a similarity reaching the first preset similarity exists in the plurality of obtained similarities. In other words, it is determined whether a maximum similarity in the plurality of obtained similarities reaches the first preset similarity. The first preset similarity is used for describing that two face images are the same, or that the two face images belong to the same person. The value of the first preset similarity may be set by a person skilled in the art according to an actual requirement. For example, the first preset similarity may be set to 95%.

In a case that a similarity reaching the first preset similarity exists in the plurality of obtained similarities, it can be determined that the two selected face image sets have same face images. That is, two face images between which a similarity reaches the first preset similarity are the same.

Optionally, in an embodiment, after the determining whether a similarity reaching a first preset similarity exists in the plurality of obtained similarities, the method further includes: obtaining an average similarity of the plurality of similarities in a case that none of the plurality of obtained similarities reaches the first preset similarity; and determining whether the average similarity reaches a second preset similarity, the second preset similarity being less than the first preset similarity; and determining, in a case that the average similarity reaches the second preset similarity, that the two face image sets have same face images.

After the plurality of similarities are obtained, it is further determined whether a similarity reaching the first preset similarity exists in the plurality of obtained similarities. In other words, it is determined whether a maximum similarity in the plurality of obtained similarities reaches the first preset similarity.

In a case that none of the plurality of obtained similarities reaches the first preset similarity, an average similarity of the plurality of obtained similarities is further calculated.

Subsequently, it is determined whether the calculated average similarity reaches a second preset similarity, the second preset similarity being configured to be less than the first preset similarity. For example, when the first preset similarity is configured to be 95%, the second preset similarity is configured to be 85%. In a case that the calculated average similarity reaches the second preset similarity, it is determined that the two selected face image sets have same face images.

Specifically, in an embodiment, the obtaining similarities among face images in the two face image sets includes: separately selecting one face image from the two face image sets, to obtain two face images; separately obtaining multi-dimensional image features of the two selected face images, to obtain a first image feature set and a second image feature set; and obtaining a distance between the first image feature set and the second image feature set, and using the obtained distance as a similarity between the two face images.

The type of the obtained image feature is not specifically limited herein, and may be selected according to an actual requirement. For example, a histogram of oriented gradient (HOG) feature, a color feature, a template feature, and a structural feature of a face image may be obtained.

After the multidimensional image features of the two face images are separately obtained to obtain the first image feature set and the second image feature set, a distance between the first image feature set and the second image feature set is obtained, and the obtained distance is used as a similarity between the two face images. A person skilled in the art may select any feature distance (such as a Euclidean distance, a Manhattan distance, or a Chebyshev distance) according to an actual requirement to measure a distance between the two image feature sets.

For example, a cosine distance between the first image feature set and the second image feature set may be obtained, and is specifically obtained according to the following formula:

$$e = \frac{\sum_{i=1}^{N} f_i g_i}{\sqrt{\sum_{i=1}^{N} f_i^2} \sqrt{\sum_{i=1}^{N} g_i^2}},$$

where e represents the cosine distance between the first image feature set and the second image feature set; f represents the first image feature set; N represents dimensions of the first image feature set and the second image feature set (dimensions of the two image feature sets are the same); fi represents an image feature in an ith dimension in the first image feature set; and gi represents an image feature in an ith dimension in the second image feature set.

S209: The server combines motion trajectories corresponding to the determined face image sets, to obtain a final motion trajectory of trajectory tracking.

After determining the at least two face image sets having the same face images, that is, after determining the face image sets belonging to a same person, the server combines motion trajectories corresponding to the determined face image sets belonging to a same person (first determining head images corresponding to the face image sets, and then determining motion trajectories corresponding to the head images as the motion trajectories corresponding to the face image sets), to obtain a final motion trajectory of trajectory tracking, that is, a complete motion trajectory corresponding to the person.

When the motion trajectories are combined, a motion trajectory A and a motion trajectory B are used as an example. If a moment of a video frame (that is, a moment at which the video frame is located in a video) in which a head image at the tail of the motion trajectory A is located is earlier than a moment of a video frame (that is, a moment at which the video frame is located in the video) in which a head image at the head of the motion trajectory B is located, the tail of the motion trajectory A is connected to the head of the motion trajectory B, thereby implementing the combination of the motion trajectory A and the motion trajectory B.

For example, referring to FIG. 2F, two determined motion trajectories belonging to a same person are shown. A motion trajectory 1 includes a head image 1, a head image 2, a head image 3, a head image 4, and a head image 5, and the 5 head images are same head images (in other words, head images of a same head in different video frames); and a motion trajectory 2 includes a head image 1', a head image 2', a head image 3', a head image 4', and a head image 5', and the 5 head images are same head images (in other words, head images of a same head in different video frames). By comparison, a moment of a video frame in which the head image 5 is located is earlier than a moment of a video frame in which the head image 1' is located. Therefore, the tail of the motion trajectory 1 is connected to the head of the motion trajectory 2, to obtain a complete motion trajectory of the person.

S210: The server synthesizes the combined motion trajectory into the surveillance video, and returns the surveillance video carrying the motion trajectory to the terminal by using the network.

After receiving the surveillance video that is returned by the server and carries the motion trajectory, the terminal can present motion trajectories of different head images at moments along with moment changes by playing the surveillance video. For example, referring to FIG. 3B, a video frame corresponding to a moment is shown.

Figure 3B:
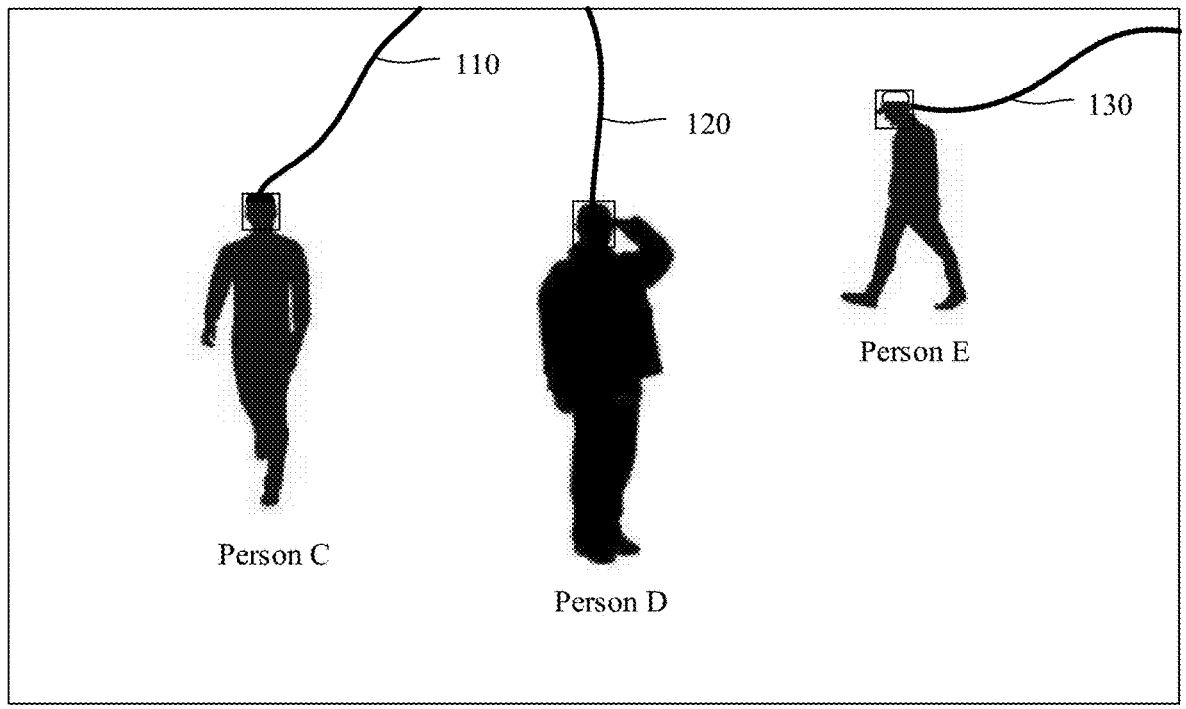
FIG. 3B is an exemplary diagram of a terminal playing a surveillance video carrying motion trajectories according to an embodiment of the present disclosure.

As shown in FIG. 3B, motion trajectories of a person C, a person D, and a person E until the moment are presented. A first motion trajectory 110 of the person C shows that the person C appears from an upper left side of a surveillance region, and walks towards a lower left side of the surveillance region; a second motion trajectory 120 of the person D shows that the person D appears from an upper side of the surveillance region, and walks towards a lower side of the surveillance region; and a third motion trajectory 130 of the person E shows that the person E appears from an upper right side of the surveillance region, and walks towards an upper left side of the surveillance region.

Optionally, in an embodiment, the server may further analyze the combined motion trajectory, to obtain an analysis result.

When the surveillance video carrying the motion trajectory is returned to the terminal by using the network, the analysis result obtained through analysis is also returned to the terminal by using the network.

An example in which the surveillance video obtained by the terminal is a surveillance video of a mall is used. After completing trajectory tracking on the surveillance video and obtaining motion trajectories after combination, the server may analyze the combined motion trajectories as follows:

1. A quantity of the combined motion trajectories is analyzed, and the quantity of the combined motion trajectories is determined. Because one motion trajectory corresponds to one person, the determined quantity of the motion trajectories may be used as a human traffic within duration corresponding to the surveillance video, thereby implementing human traffic monitoring on the mall.

2. For the combined motion trajectories, location points (that is, centroids of head images in the video frames, centroids of head images of a same person in different video frames being connected to form a motion trajectory) at which stay duration exceeds preset duration on the motion trajectories are extracted, and the location points are used as main stay points, so as to obtain main stay points of all the motion trajectories. Subsequently, the obtained main stay points are clustered, to obtain main stay regions of the motion trajectories. The main stay regions are associated with counters in the mall within a surveillance region, counters at which the human traffic mainly stays, that is, counters preferred by the human traffic, can then be obtained through analysis, thereby analyzing the preference of the human traffic for shops.

In addition, a person skilled in the art may further configure an analysis rule of another type for the server according to an actual requirement. The server completes analysis of the motion trajectories, to obtain a required analysis result.

For the convenience of better implementing the trajectory tracking method provided in one embodiment of the present disclosure, a trajectory tracking apparatus is further provided in an embodiment. Terms have meanings the same as those in the foregoing trajectory tracking method, and for specific implementation details, reference may be made to the description in the method embodiments.

Figure 4A:
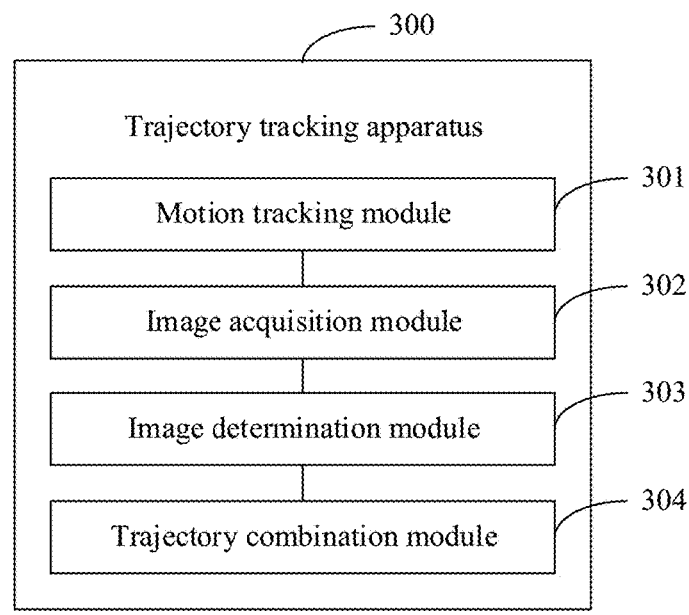
FIG. 4A is a first schematic structural diagram of a trajectory tracking apparatus according to an embodiment of the present disclosure.

In an embodiment, a trajectory tracking apparatus is further provided. As shown in FIG. 4A, the trajectory tracking apparatus may include a motion tracking module 301, an image acquisition module 302, an image determination module 303, and a trajectory combination module 304.

The motion tracking module 301 is configured to perform motion tracking on head images in a plurality of video frames, to obtain motion trajectories corresponding to the head images.

The image acquisition module 302 is configured to acquire face images corresponding to the head images in the video frames, to obtain face image sets corresponding to the head images.

The image determination module 303 is configured to determine, from the face image sets corresponding to the head images, at least two face image sets having the same face images.

The trajectory combination module 304 is configured to combine motion trajectories corresponding to the determined face image sets.

Figure 4B:
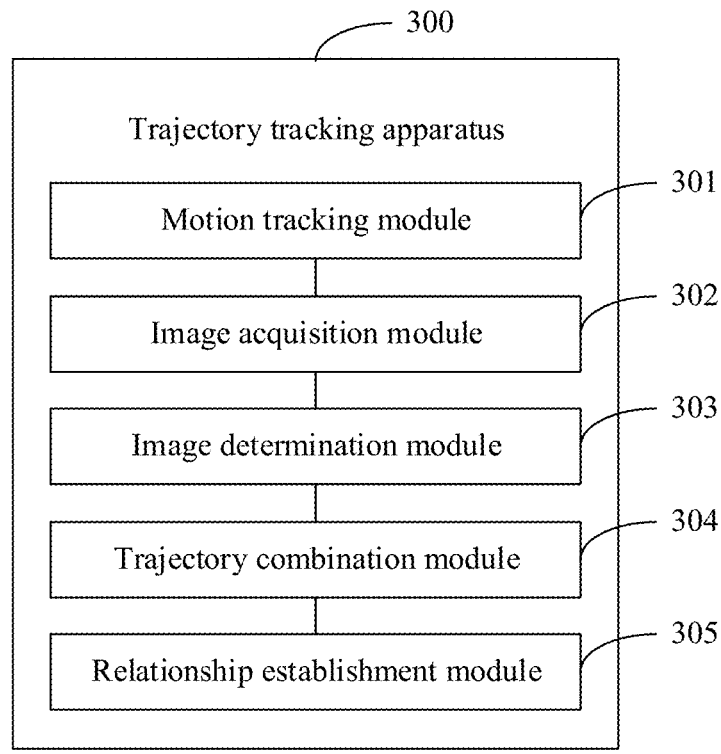
FIG. 4B is a second schematic structural diagram of the trajectory tracking apparatus according to an embodiment of the present disclosure.

Referring to FIG. 4B, in an embodiment, the trajectory tracking apparatus further includes a relationship establishment module 305, configured to: perform head detection and face detection on the plurality of video frames, to determine head images and face images in the video frames; and determine head images and face images that are in the video frames and belong to a same person, and establishing correspondences between the head images and the face images that belong to a same person.

The image acquisition module 302 is specifically configured to acquire, according to the correspondences established by the relationship establishment module 305, face images corresponding to the head images in the video frames.

In an embodiment, the relationship establishment module 305 is specifically configured to: obtain area overlap ratios between the head images and the face images that are determined from the video frames; and determine, according to the area overlap ratios obtained from the video frames, head images and face images that are in the video frames and belong to a same person.

In an embodiment, the relationship establishment module 305 is further specifically configured to: perform bipartite graph optimal matching on the head images and the face images in the video frames according to the area overlap ratios obtained from the video frames; and determine that head images and face images that are in the video frames and match each other belong to a same person.

In an embodiment, the image determination module 303 is specifically configured to: select two face image sets from the face image sets corresponding to the head images; obtain similarities among face images in the two face image sets, to obtain a plurality of similarities; and determine whether a similarity reaching a first preset similarity exists in the plurality of obtained similarities; and determine, in a case that a similarity reaching the first preset similarity exists in the plurality of similarities, that the two selected face image sets have same face images.

In an embodiment, the image determination module 303 is further configured to: obtain an average similarity of the plurality of similarities in a case that none of the plurality of obtained similarities reaches the first preset similarity; and determine whether the average similarity reaches a second preset similarity, the second preset similarity being less than the first preset similarity; and determine, in a case that the average similarity reaches the second preset similarity, that the two selected face image sets have same face images.

In an embodiment, the image determination module 303 is further configured to: separately select one face image from the two selected face image sets, to obtain two face images; separately obtain multidimensional image features of the two face images, to obtain a first image feature set and a second image feature set; and obtain a distance between the first image feature set and the second image feature set, and use the obtained distance as a similarity between the two selected face images.

During specific implementation, the foregoing modules may be implemented as independent entities or may be randomly combined as a same entity or several entities for implementation. For specific implementations of the foregoing modules, refer to the foregoing method embodiments. Details are not repeated again.

It can be learned from above that the trajectory tracking apparatus performs motion tracking on head images in a plurality of video frames by using the motion tracking module 301, to obtain motion trajectories corresponding to the head images; acquires, by using the image acquisition module 302, face images corresponding to the head images in the video frames, to obtain face image sets corresponding to the head images; determines, by using the image determination module 303 and from the face image sets corresponding to the head images, at least two face image sets having the same face images; and combines, by using the trajectory combination module 304, motion trajectories corresponding to the determined face image sets. Because a head feature is relatively fixed compared with other parts of a human body and is less likely to be blocked, a more accurate motion trajectory can be obtained by performing motion tracking on a head image compared with performing motion tracking on an entire human body. Even though tracking is interrupted, interrupted motion trajectories can be combined by using the face images corresponding to the head images, so as to improve the accuracy of motion tracking.

Figure 5:
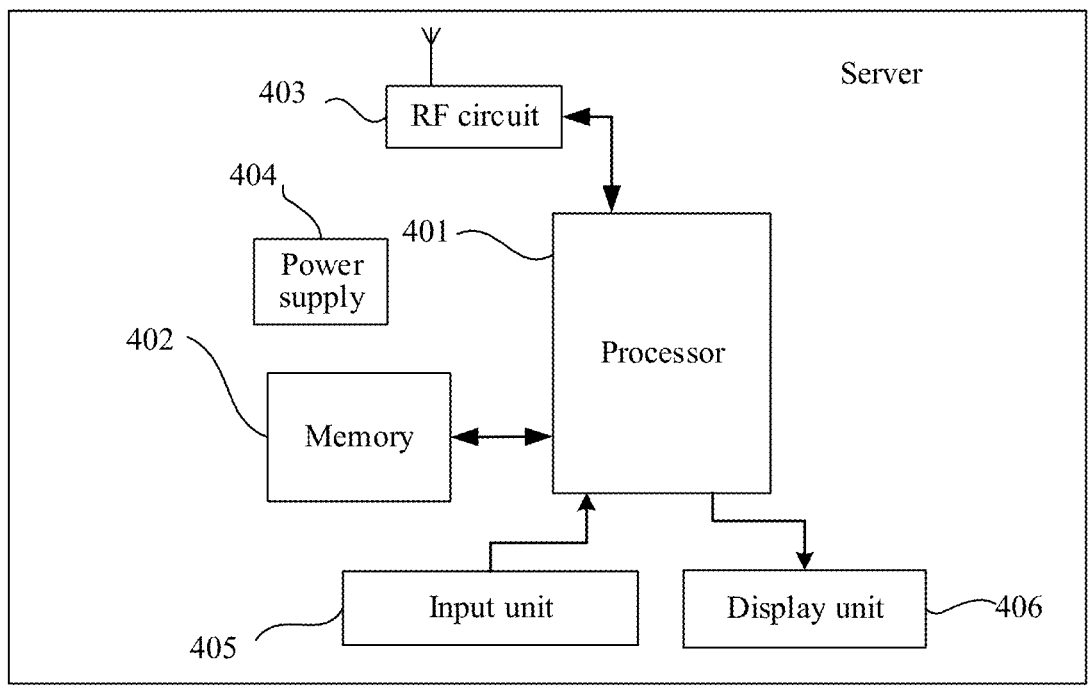
FIG. 5 is a schematic structural diagram of a server according to an embodiment of the present disclosure.

Referring to FIG. 5, the present disclosure provides a server that may include components such as a processor 401 including one or more processing cores, a memory 402 including one or more computer-readable storage media, a radio frequency (RF) circuit 403, a power supply 404, an input unit 405, and a display unit 406. A person skilled in the art may understand that the server structure shown in FIG. 5 does not constitute a limit to the server. The server may include more or fewer parts than those shown in the figure, may combine some parts, or may have different part arrangements.

The processor 401 is a control center of the server, and is connected to various parts of the entire server by using various interfaces and lines. By running or executing a software program and/or module stored in the memory 402, and invoking data stored in the memory 402, the processor 401 executes various functions of the server and performs data processing, thereby monitoring the entire server. Optionally, the processor 401 may include one or more processing cores. Preferably, the processor 401 may integrate an application processor and a modem, where the application processor mainly processes an operating system, a user interface, and an application program and the like, and the modem mainly processes wireless communication. It can be understood that the foregoing modem may alternatively not be integrated into the processor 401.

The memory 402 may be configured to store a software program and a module. The processor 401 runs the software program and the module stored in the memory 402, to perform various functional applications and data processing.

The RF circuit 403 may be configured to receive and transmit signals in a process of information receiving and transmission.

The server further includes the power supply 404 (for example, a battery) that supplies power to each component. Preferably, the power supply may be logically connected to the processor 401 by using a power supply management system, so that functions such as management of charging, discharging, and power consumption are implemented by using the power supply management system.

The server may further include an input unit 405. The input unit 405 may be configured to receive inputted digit or character information, and generate a keyboard, mouse, joystick, optical or track ball signal input related to the user setting and function control.

The server may further include the display unit 406. The display unit 406 may be configured to display information entered by the user or information provided for the user, and various graphical user interfaces of the server. The graphical user interfaces may be formed by a graph, text, an icon, a video, or any combination thereof. Specifically, in one embodiment, the processor 401 in the server loads, into the memory 402 according to the following instructions, executable files corresponding to processes of one or more application programs, and the processor 401 runs the application programs stored in the memory 402 to implement the followings: performing motion tracking on head images in a plurality of video frames, to obtain motion trajectories corresponding to the head images; acquiring face images corresponding to the head images in the video frames, to obtain face image sets corresponding to the head images; determining, from the face image sets corresponding to the head images, at least two face image sets having the same face images; and combining motion trajectories corresponding to the determined face image sets.

For specific introduction of the steps in the trajectory tracking method, reference may be made to the description of the foregoing method examples, and details are not repeated herein.

Figure 6:
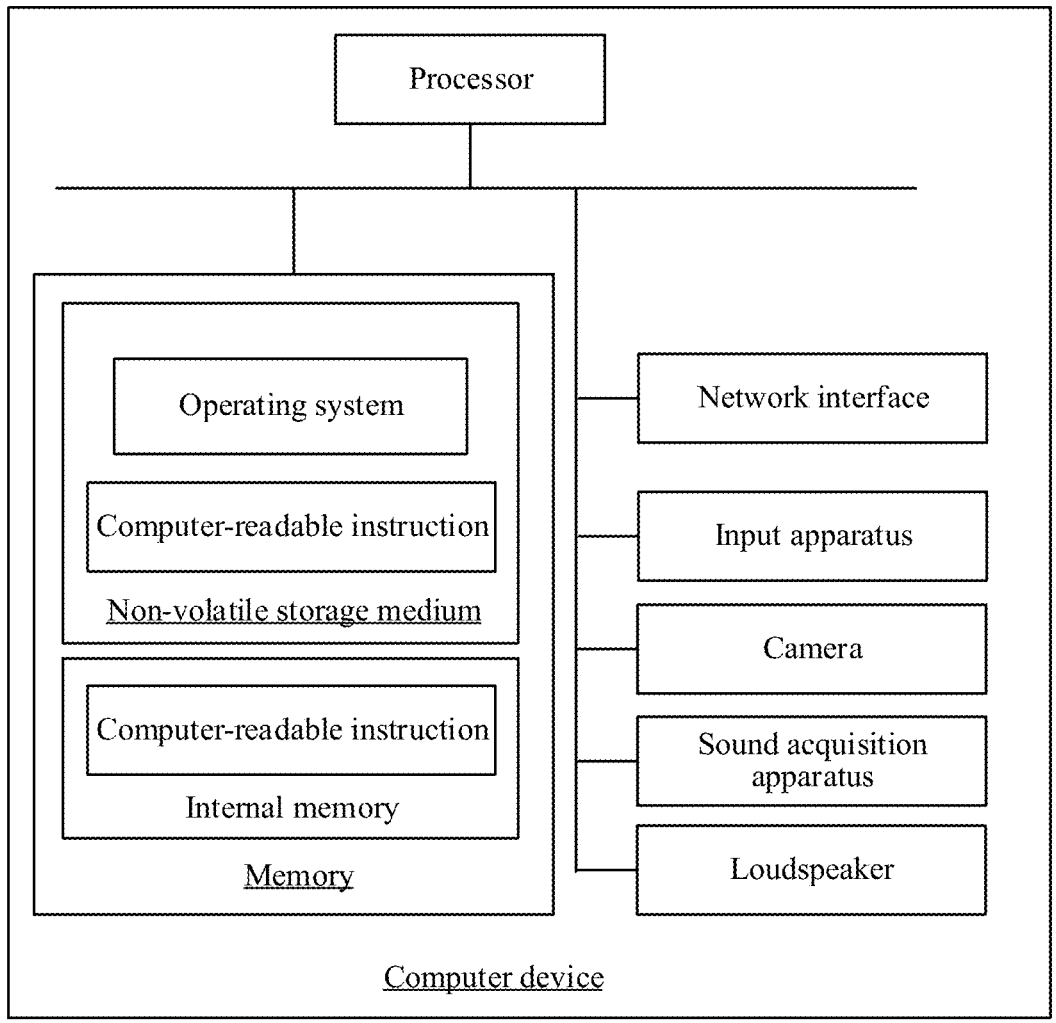
FIG. 6 is a schematic diagram of the internal structure of a computer device according to an embodiment of the present disclosure.

FIG. 6 is a diagram of the internal structure of a computer device in an embodiment. The computer device may be specifically a server. As shown in FIG. 6, the computer device includes a processor, a memory, a network interface, an input apparatus, and a camera apparatus that are connected by a system bus. The memory includes a non-volatile storage medium and an internal memory. The non-volatile storage medium of the computer device stores an operating system, and may further store a computer-readable instruction. The computer-readable instruction, when executed by the processor, may cause the processor to implement the trajectory tracking method. The internal memory may also store a computer-readable instruction, and the computer-readable instruction, when executed by a processor, may cause the processor to perform the trajectory tracking method. The camera apparatus of the computer device is a camera, configured to capture an image. The input apparatus of the computer device may be a touch layer covering a display screen, or may be a button, a trackball, or a touch panel disposed on a housing of the computer device, or may be an external keyboard, a touch panel, or a mouse. It may be noted that, the structure shown in FIG. 6 is only a block diagram of a partial structure related to the solution in the present disclosure, and does not limit the computer device.

Specifically, the computer device may include more components or fewer components than those shown in the figure, or some components may be combined, or a different component deployment may be used.

In an embodiment, the trajectory tracking method provided in the present disclosure may be implemented in the form of a computer-readable instruction, and the computer-readable instruction may run on the computer device shown in FIG. 6. The memory of the computer device may store program modules forming a trajectory tracking apparatus, for example, the motion tracking module 301, the image acquisition module 302, the image determination module 303, and the trajectory combination module 304 in FIG. 4A. A computer-readable instruction formed by the program modules causes the processor to perform the steps in the trajectory tracking apparatus described in the present disclosure. For example, the computer device shown in FIG. 6 may perform motion tracking on head images in a plurality of video frames by using the motion tracking module 301, to obtain motion trajectories corresponding to the head images; acquire, by using the image acquisition module 302, face images corresponding to the head images in the video frames, to obtain face image sets corresponding to the head images; determine, by using the image determination module 303 and from the face image sets corresponding to the head images, at least two face image sets having the same face images; and combine, by using the trajectory combination module 304, motion trajectories corresponding to the determined face image sets, to obtain a final motion trajectory of trajectory tracking, where the motion tracking module 301, the image acquisition module 302, the image determination module 303, and the trajectory combination module 304 of the trajectory tracking apparatus are shown in FIG. 4A.

In an embodiment, a computer device is provided. The computer device includes a memory and a processor, the memory storing a computer-readable instruction, and the computer-readable instruction, when executed by the processor, causing the processor to perform the steps in the foregoing trajectory tracking method. The steps of the trajectory tracking method herein may be the steps of the trajectory tracking method in the foregoing embodiments.

In an embodiment, a computer-readable storage medium is provided. The computer-readable storage medium stores a computer-readable instruction, and the computer-readable instruction, when executed by the processor, causing the processor to perform the steps in the foregoing trajectory tracking method. The steps of the trajectory tracking method herein may be the steps of the trajectory tracking method in the foregoing embodiments.

It is to be understood that the steps in the embodiments of the present disclosure are not necessarily performed in an order indicated by the step numbers. Unless explicitly specified in the present disclosure, the sequence for performing the steps is not strictly limited, and the steps may be performed in other sequences. Moreover, at least some of the steps in each embodiment may include a plurality of sub-steps or a plurality of stages. The sub-steps or stages are not necessarily performed at the same moment but may be performed at different moments. These sub-steps or stages are not necessarily performed in sequence, but may be performed in turn or alternately with at least some of other steps or sub-steps or stages of the other steps.

Further, some or all procedures in the methods in the foregoing embodiments may be implemented by a computer-readable instruction instructing related hardware, the program may be stored in a non-volatile computer-readable storage medium, and when the program is executed, the procedures in the foregoing method embodiments may be implemented. Any reference to the memory, storage, a database, or other media used in the embodiments provided in the present disclosure may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash. The volatile memory may include a random access memory (RAM) or an external cache. As an illustration instead of a limitation, the RAM is available in various forms, such as a static RAM (SRAM), a dynamic RAM (DRAM), a synchronous DRAM (SDRAM), a double data rate SDRAM (DDRSDRAM), an enhanced SDRAM (ESDRAM), a synchronization link (Synchlink) DRAM (SLDRAM), a rambus direct RAM (RDRAM), a direct rambus dynamic RAM (DRDRAM), and a rambus dynamic RAM (RDRAM).

The technical features in the foregoing embodiments may be randomly combined. To make the description concise, not all possible combinations of the technical features in the foregoing embodiments are described. However, combinations of the technical features shall all be considered as falling within the scope described in this specification provided that the combinations of the technical features do not conflict with each other.

The foregoing embodiments only describe several implementations of the present disclosure, and are described in detail, but they shall not be construed as a limitation to the scope of the present disclosure. A person of ordinary skill in the art may further make variations and improvements without departing from the concept of the present disclosure, which all fall within the protection scope of the present disclosure. Therefore, the protection scope of the present disclosure shall be subject to the appended claims.

What is claimed is:

1. A trajectory tracking method for a computer device, comprising:
    performing motion tracking on head images in a plurality of video frames, to obtain motion trajectories corresponding to the head images;
    acquiring face images corresponding to the head images in the video frames, to obtain face image sets corresponding to the head images;
    determining from the face image sets corresponding to the head images, at least two face image sets having same face images; and
    combining motion trajectories corresponding to the at least two face image sets having same face images, to obtain a final motion trajectory of trajectory tracking.

2. The trajectory tracking method according to claim 1, wherein:
    before the performing motion tracking on head images in a plurality of video frames, the method further comprises:
    performing head detection and face detection on the plurality of video frames, to determine head images and face images in the video frames; and
    determining head images and face images that are in the video frames and belong to a same person, and establishing correspondences between the head images and the face images that belong to a same person; and
    the acquiring face images corresponding to the head images in the video frames comprises:
    acquiring according to the established correspondences, the face images corresponding to the head images in the video frames.

3. The trajectory tracking method according to claim 2, wherein the determining head images and face images that are in the video frames and belong to a same person comprises:

obtaining the area overlap ratios between the head images and the face images that are determined from the video frames; and determining according to the area overlap ratios obtained from the video frames, head images and face images that are in the video frames and belong to a same person.

4. The trajectory tracking method according to claim 3, wherein the determining according to the area overlap ratios obtained from the video frames, head images and face images that are in the video frames and belong to a same person comprises:

performing bipartite graph optimal matching on the head images and the face images in the video frames according to the area overlap ratios obtained from the video frames; and determining that head images and face images that are in the video frames and match each other belong to a same person.

5. The trajectory tracking method according to claim 1, wherein the determining from the face image sets corresponding to the head images, at least two face image sets having the same face images comprises:

selecting two face image sets from the face image sets corresponding to the head images;

obtaining similarities among face images in the two face image sets, to obtain a plurality of similarities; and determining, in a case that a similarity reaching a first preset similarity exists in the plurality of similarities, that the two face image sets have same face images.

6. The trajectory tracking method according to claim 5, wherein before the determining that the two face image sets have same face images, the method further comprises:

obtaining an average similarity of the plurality of similarities in a case that none of the plurality of similarities reaches the first preset similarity; and determining, in a case that the average similarity reaches a second preset similarity, that the two face image sets have same face images, the second preset similarity being less than the first preset similarity.

7. The trajectory tracking method according to claim 5, wherein the obtaining similarities among face images in the two face image sets comprises:

separately selecting one face image from the two face image sets, to obtain two face images;

separately obtaining multidimensional image features of the two face images, to obtain a first image feature set and a second image feature set; and obtaining a distance between the first image feature set and the second image feature set, and using the obtained distance as a similarity between the two face images.

8. A computer device, comprising:
a memory storing computer-readable instructions; and
a processor coupled to the memory and, when executing the computer-readable instructions, configured to perform:

performing motion tracking on head images in a plurality of video frames, to obtain motion trajectories corresponding to the head images;

acquiring face images corresponding to the head images in the video frames, to obtain face image sets corresponding to the head images;

determining from the face image sets corresponding to the head images, at least two face image sets having same face images; and combining motion trajectories corresponding to the at least two face image sets having same face images, to obtain a final motion trajectory of trajectory tracking.

9. The computer device according to claim 8, wherein:
before the performing motion tracking on head images in a plurality of video frames, the processor is further configured to perform:

performing head detection and face detection on the plurality of video frames, to determine head images and face images in the video frames; and determining head images and face images that are in the video frames and belong to a same person, and establishing correspondences between the head images and the face images that belong to a same person; and the acquiring face images corresponding to the head images in the video frames comprises:

acquiring according to the established correspondences, the face images corresponding to the head images in the video frames.

10. The computer device according to claim 9, wherein the determining head images and face images that are in the video frames and belong to a same person comprises:

obtaining the area overlap ratios between the head images and the face images that are determined from the video frames; and determining according to the area overlap ratios obtained from the video frames, head images and face images that are in the video frames and belong to a same person.

11. The computer device according to claim 10, wherein the determining according to the area overlap ratios obtained from the video frames, head images and face images that are in the video frames and belong to a same person comprises:

performing bipartite graph optimal matching on the head images and the face images in the video frames according to the area overlap ratios obtained from the video frames; and determining that head images and face images that are in the video frames and match each other belong to a same person.

12. The computer device according to claim 8, wherein the determining from the face image sets corresponding to the head images, at least two face image sets having the same face images comprises:

selecting two face image sets from the face image sets corresponding to the head images;

obtaining similarities among face images in the two face image sets, to obtain a plurality of similarities; and determining, in a case that a similarity reaching a first preset similarity exists in the plurality of similarities, that the two face image sets have same face images.

13. The computer device according to claim 12, wherein before the determining that the two face image sets have same face images, the processor is further configured to perform:

obtaining an average similarity of the plurality of similarities in a case that none of the plurality of similarities reaches the first preset similarity; and determining, in a case that the average similarity reaches a second preset similarity, that the two face image sets have same face images, the second preset similarity being less than the first preset similarity.

14. The computer device according to claim 12, wherein the obtaining similarities among face images in the two face image sets comprises:
- separately selecting one face image from the two face image sets, to obtain two face images;
- separately obtaining multidimensional image features of the two face images, to obtain a first image feature set and a second image feature set; and
- obtaining a distance between the first image feature set and the second image feature set, and using the obtained distance as a similarity between the two face images.

15. A non-transitory computer-readable storage medium storing computer program instructions executable by at least one processor to perform:
- performing motion tracking on head images in a plurality of video frames, to obtain motion trajectories corresponding to the head images;
- acquiring face images corresponding to the head images in the video frames, to obtain face image sets corresponding to the head images;
- determining from the face image sets corresponding to the head images, at least two face image sets having same face images; and
- combining motion trajectories corresponding to the at least two face image sets having same face images, to obtain a final motion trajectory of trajectory tracking.

16. The non-transitory computer-readable storage medium according to claim 15, wherein:
- before the performing motion tracking on head images in a plurality of video frames, the processor is further to perform:
- performing head detection and face detection on the plurality of video frames, to determine head images and face images in the video frames; and
- determining head images and face images that are in the video frames and belong to a same person, and establishing correspondences between the head images and the face images that belong to a same person; and
- the acquiring face images corresponding to the head images in the video frames comprises:
- acquiring according to the established correspondences, the face images corresponding to the head images in the video frames.

17. The non-transitory computer-readable storage medium according to claim 16, wherein the determining head images and face images that are in the video frames and belong to a same person comprises:
- obtaining the area overlap ratios between the head images and the face images that are determined from the video frames; and
- determining according to the area overlap ratios obtained from the video frames, head images and face images that are in the video frames and belong to a same person.

18. The non-transitory computer-readable storage medium according to claim 17, wherein the determining according to the area overlap ratios obtained from the video frames, head images and face images that are in the video frames and belong to a same person comprises:
- performing bipartite graph optimal matching on the head images and the face images in the video frames according to the area overlap ratios obtained from the video frames; and
- determining that head images and face images that are in the video frames and match each other belong to a same person.

19. The non-transitory computer-readable storage medium according to claim 15, wherein the determining from the face image sets corresponding to the head images, at least two face image sets having the same face images comprises:
- selecting two face image sets from the face image sets corresponding to the head images;
- obtaining similarities among face images in the two face image sets, to obtain a plurality of similarities; and
- determining, in a case that a similarity reaching a first preset similarity exists in the plurality of similarities, that the two face image sets have same face images.

20. The non-transitory computer-readable storage medium according to claim 19, wherein before the determining that the two face image sets have same face images, the method further comprises:
- obtaining an average similarity of the plurality of similarities in a case that none of the plurality of similarities reaches the first preset similarity; and
- determining, in a case that the average similarity reaches a second preset similarity, that the two face image sets have same face images, the second preset similarity being less than the first preset similarity.

* * * * *